Patented Jan. 1, 1929.

1,697,111

UNITED STATES PATENT OFFICE.

WILHELM ECKERT, OF HOCHST-ON-THE-MAIN, GERMANY, ASSIGNOR TO GRASSELLI DYESTUFF CORPORATION, OF NEW YORK, N. Y., A CORPORATION OF DELAWARE.

6-AMINO-5-ACENAPHTHENECARBOXYLIC ACID AND PROCESS OF MAKING SAME.

No Drawing. Application filed July 5, 1927, Serial No. 203,678, and in Germany July 24, 1926.

The present invention relates to the hitherto unknown 6-amino-5-acenaphthenecarboxylic acid compounds and to a process of preparing the same.

There has not yet been disclosed a process for preparing the 6-amino-acenaphthene-5-carboxylic acid of the formula:

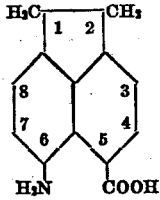

Now I have found that the said acid, or salts thereof, can be prepared by treating with a reducing agent the 6-nitro-acenaphthene-5-carboxylic acid obtainable by nitrating the 5-acenaphthenecarboxylic acid.

The new acenaphthene compound is a valuable parent product for the manufacture of vat dyestuffs.

The following examples serve to illustrate my invention, but are not intended to limit it thereto, the parts being parts by weight.

1. 40 parts of 6-nitro-acenaphthene-5-carboxylic acid are dissolved in an excess of ammonia and to the resulting solution there is slowly added a solution of 280 parts of ferrous sulfate in water. During this operation the green color of the ferrous hydroxide changes to a brown color. When the operation is finished, it is advantageous to heat the mixture for a further short time to 70° C.–80° C., to filter it off warm and to precipitate the filtrate with a mineral acid, for instance hydrochloric acid.

The hydrochloride of the 6-aminoacenaphthene-5-carboxylic acid which has separated is filtered off by suction, washed until neutral and dried. It occurs as colorless prisms having a melting point of about 300° C.

2. Into a solution of 10 parts of 6-nitroacenaphthene-5-carboxylic acid in an excess of concentrated ammonia are gradually introduced, while heating and stirring, 20 parts of zinc dust and this mixture is heated to gentle boiling for a short time. The unconsumed zinc dust is filtered off by suction and the new compound is precipitated from the filtrate by the addition of a mineral acid.

The new compound may be purified by redissolution in water and precipitation with a concentrated mineral acid. Its properties are identical with those of the product obtainable according to Example 1.

3. 10 parts of 6-nitro-5-acenaphthenecarboxylic acid are introduced into 150 parts of concentrated hydrochloric acid and there are then gradually added, while stirring, 30 parts of stannous chloride. After having stirred the mixture for 8 hours at ordinary temperature it is heated for another three hours to 70° C.–80° C. The mass is then diluted with water, the resulting colorless product is filtered by suction and washed with water. The product thus obtained is dissolved in diluted ammonia, the solution is filtered and acidified with hydrochloric acid. In this manner the hydrochloride of the 6-amino-5-acenaphthenecarboxylic acid is separated, the properties of which are identical with those of the products obtained according to the foregoing examples.

I claim:

1. As new products, the compounds of the general formula

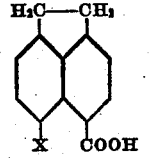

wherein X represents one of the substituents —NH$_2$ and —NH$_2$.acid.

2. As new products the compounds of the general formula

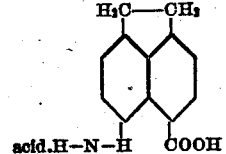

3. As a new product the hydrochloride of 6-amino-acenaphthene-5-carboxylic acid of the formula
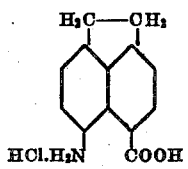
which is diazotizable and forms colorless needles, having a melting point of about 300° C., being soluble nearly colorless in hot water, in concentrated sulfuric acid and in ammonia.
In testimony whereof, I affix my signature.
DR. WILHELM ECKERT.